United States Patent [19]

Larsson et al.

[11] Patent Number: 5,601,013

[45] Date of Patent: Feb. 11, 1997

[54] ARRANGEMENT FOR GENERATING STEAM IN OVENS

[75] Inventors: Lennart Larsson, Borås; Jonas Persson, Fristad, both of Sweden

[73] Assignee: Sveba-Dahlen AB, Sweden

[21] Appl. No.: 557,957

[22] Filed: Nov. 13, 1995

[30] Foreign Application Priority Data

Nov. 17, 1994 [SE] Sweden ................................ 9403983

[51] Int. Cl.[6] .............................. A21B 1/00; A21B 1/08; A21C 13/00; F24C 15/32
[52] U.S. Cl. .............................. 99/476; 99/330; 99/483; 126/20; 126/21 A; 219/401
[58] Field of Search .......................... 99/330, 473–476, 99/468, 483; 126/20, 21 A, 400, 469; 219/400, 401, 492, 389; 392/402; 165/902

[56] References Cited

U.S. PATENT DOCUMENTS

| | | | |
|---|---|---|---|
| 3,886,346 | 5/1975 | Meyers | 219/386 |
| 4,373,430 | 2/1983 | Allen | 99/468 |
| 4,483,243 | 11/1984 | Cote | 312/236 X |
| 4,587,946 | 5/1986 | Doyon et al. | 126/20 |
| 4,623,780 | 11/1986 | Shelton | 219/401 |
| 4,646,630 | 3/1987 | McCoy et al. | 99/474 X |
| 4,674,402 | 6/1987 | Raufeisen | 99/476 X |
| 4,724,824 | 2/1988 | McCoy et al. | 126/369 |
| 4,730,100 | 3/1988 | Pingelton | 219/401 |
| 4,782,214 | 11/1988 | Voegtlin | 219/400 X |
| 4,785,151 | 11/1988 | Voegtlin | 219/401 X |
| 4,839,502 | 6/1989 | Swanson et al. | 219/401 |
| 5,161,517 | 11/1992 | Johansson . | |
| 5,394,791 | 3/1995 | Vallee | 99/476 X |

*Primary Examiner*—Timothy F. Simone
*Attorney, Agent, or Firm*—Barnes & Thornburg

[57] ABSTRACT

An arrangement for generating steam in ovens, particularly baker's ovens, comprising a stand which carries a plurality of superposed and generally horizontally extending gutter means (8, 9) whose bottoms include a plurality of through-penetrating holes (11) which allow water to pass to underlying gutter means, and further comprising members (12) which are mounted adjacent the holes and which partially covering the holes. The members (12) have an elongated form and extend through holes (11) in at least two gutter means (8, 9) arranged one above the other, and the cross-sectional area of the members (12) in the hole region is smaller than the cross-sectional areas of the gutter means.

7 Claims, 3 Drawing Sheets

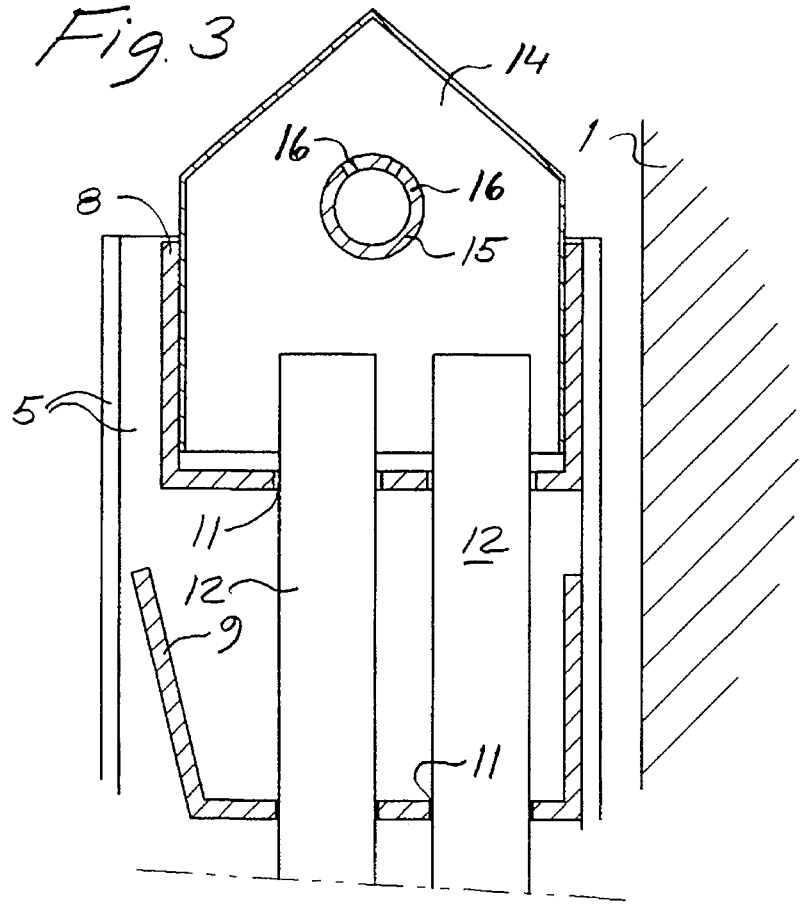
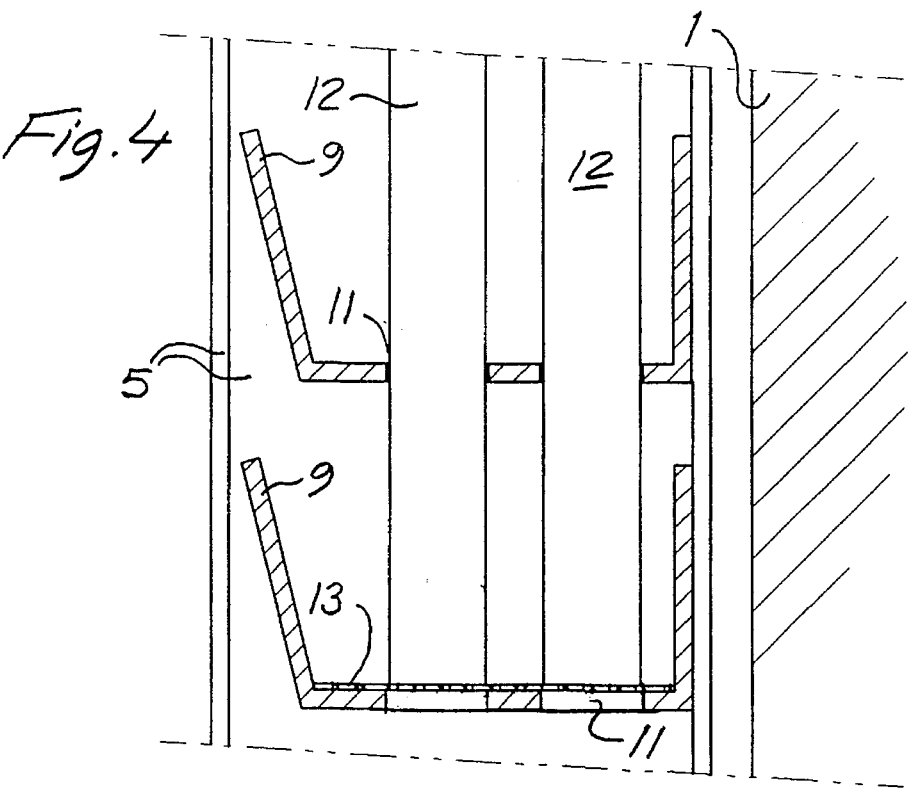

ARRANGEMENT FOR GENERATING STEAM IN OVENS

TECHNICAL FIELD

The present invention relates to an arrangement for generating steam in ovens, particularly baking ovens, comprising a stand with a plurality of mutually superposed and generally horizontally extending gutter means whose bottoms include a plurality of through-passing holes through which water can pass to underlying gutter means, and which are covered partially by bodies disposed adjacent said holes.

DESCRIPTION OF THE PRIOR ART

When baking bread in baking ovens, hot air is brought into contact with the bread. The hot air is mixed with steam, so as to obtain an attractive surface both with regard to its color and flavor. The steam is generated by one or more steam packs or units which in the case of rack ovens, i.e. conventional chamber ovens, is/are normally mounted within the oven.

In order to ensure that vapourization will take place quickly and effectively, it has been proposed, e.g. in SE 468 741, to provide the steam pack with horizontally extending and mutually superposed perforated gutters, through which water is able to flow to underlying gutters. The holes form ball seats and are configured so that when the balls are sprayed with water, that water which has not been vapourized will flow out through those hole regions that are not covered by the balls.

This solution, however, is encumbered with drawbacks. One drawback is that a large number of balls are required, which makes manufacture of the steam pack time-consuming. Another drawback is that the balls can be displaced from their intended positions during installation and transportation of the oven.

SUMMARY OF THE INVENTION

An object of the present invention is to remove at least partially the drawbacks of earlier known arrangements of the kind defined in the introduction, and to provide a steam generating arrangement which is effective and reliable in operation and which is also simple and cheap to manufacture.

This object is fulfilled with an arrangement constructed in accordance with the invention and having the features set forth in the characterizing clause of the following Claims.

BRIEF DESCRIPTION OF THE DRAWINGS

FIG. 3 is a sectional view taken generally on the line III—III in FIG. 2; and

FIG. 4 is a sectional view taken generally on the line IV—IV in FIG. 2.

DESCRIPTION OF PREFERRED EMBODIMENTS

Figure 1:
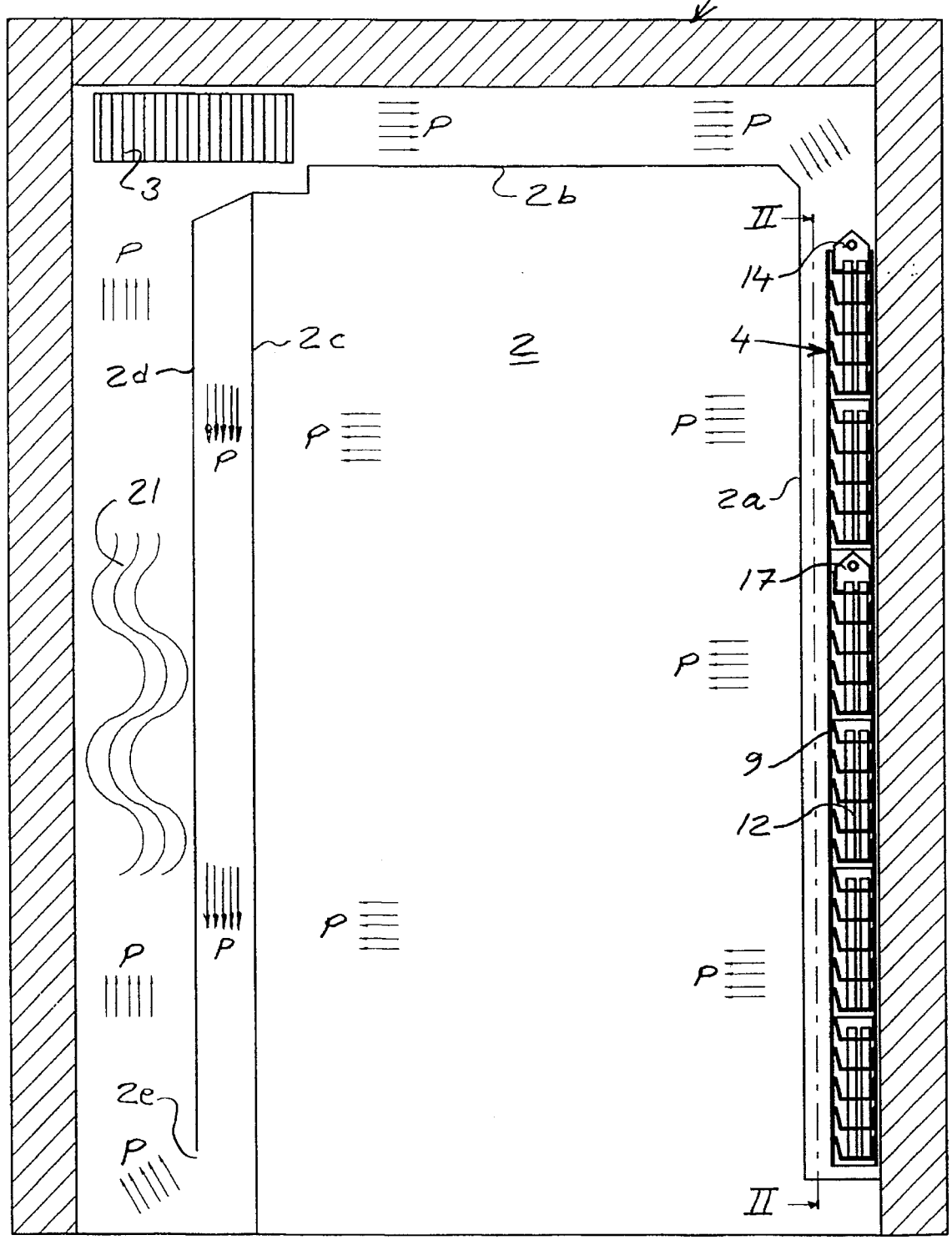
FIG. 1 is a vertical sectional view of an inventive steam generating arrangement incorporated in a baking oven.

The rack oven 1 shown in FIG. 1 is of conventional design and will not therefore be described in detail here. The oven includes an oven chamber 2 into which a rack trolley (not shown) carrying bread to be baked is moved. The oven chamber 2 is delimited by a wall 2a which includes adjustable openings, an air-impervious roof or ceiling 2b, a perforated wall 2c, an air-impermeable wall 2d and two air-impermeable side walls (not shown) which are perpendicular to the walls 2a, c, d and joined thereto. As the bread is baked, hot air flows through the oven chamber 2 in the directions of the arrows P. The air flow is generated by a fan or blower 3 mounted in the upper part of the oven, above the roof or ceiling 2b.

A steam generating arrangement 4 is mounted within the oven 1, but outside the oven chamber 2. The illustrated arrangement 4 is located between one of the insulated outer walls of the oven 1 and the wall 2a, although said arrangement may equally as well be placed somewhere else, for instance between the walls 2c and 2d. Alternatively, several such arrangements may be placed in the oven.

The steam generating arrangement 4 is comprised of a parallelepipedic flat pack which is held together by a frame having two of several parts comprised of end-walls 5 and 6 of U-shaped cross-section, an upper profile 8 and a plurality of mutually identical profiles 9 which are spaced equidistant from one another. The profiles 9 are attached to the end-walls 5, 6. The pack can be readily given a smaller height than the height shown in the Figures, by removing one or more units A–F, each including a part of each end-wall 5, 6 and five profiles 9.

Seen in cross-section, the profiles 8 and 9 have the form of generally U-shaped gutters or channels. The gutters 8, 9 are located vertically in line with one another and at a small distance apart. Each gutter 8, 9 includes two rows of through-penetrating holes 11 along its full length. The holes 11 are suitably circular in shape and may have a diameter of about 17 mm. Each unit A–F included in the arrangement 4 comprises rods or bars 12 in numbers corresponding to the number of holes 11 in respective gutters 8, 9. The rods 12 are made of aluminium and are circular-cylindrical in shape and suitably homogenous. The length of each rod 12 is slightly smaller than the height of a unit A–F and its diameter is about 16 mm. Each rod 12 is removably inserted in four mutually superposed holes 11 in the gutters 8, 9. The lower end of each rod 12 rests on a flow spreader in the form of a perforated plate 13 which is placed removably on the lowermost profile 9 of each unit A–F. The size of the perforations in the plates 13 is considerably smaller than the diameter of the rods 12.

Mounted at the upper part of the steam generating arrangement 4 is a water distributing chamber 14 which is attached to the profile 8 and extends along almost the whole width of the arrangement. Extending through the chamber 14 is a pipe 15 which is provided with two rows of holes 16 along its length. The holes are directed obliquely upwards, so that water flowing through the pipe will be thrown out onto the ceiling of the chamber 14 and spread out prior to meeting the chamber walls, the gutter 8 and the rods 12. Hot air flowing past the profile 8 and the upper ends of the rod 12 that project into the chamber 14 is moistened with the water present therein. The water that is not entrained by the hot circulating air runs down through the holes 11 and along the mantle surfaces of the rods 12 and into the underlying gutter 9. The water that is not entrained by the air passing over this latter gutter 9 runs down through the holes 11 in said gutter and passes along the rods towards the nearest underlying gutter, and so on. When the water reaches the lower ends of the rods 12, the water is distributed by the plate 13 and runs down further in the pack. After having passed the last gutter 9 in the unit F, the excess water is drained off through the bottom of the oven.

Figure 2:
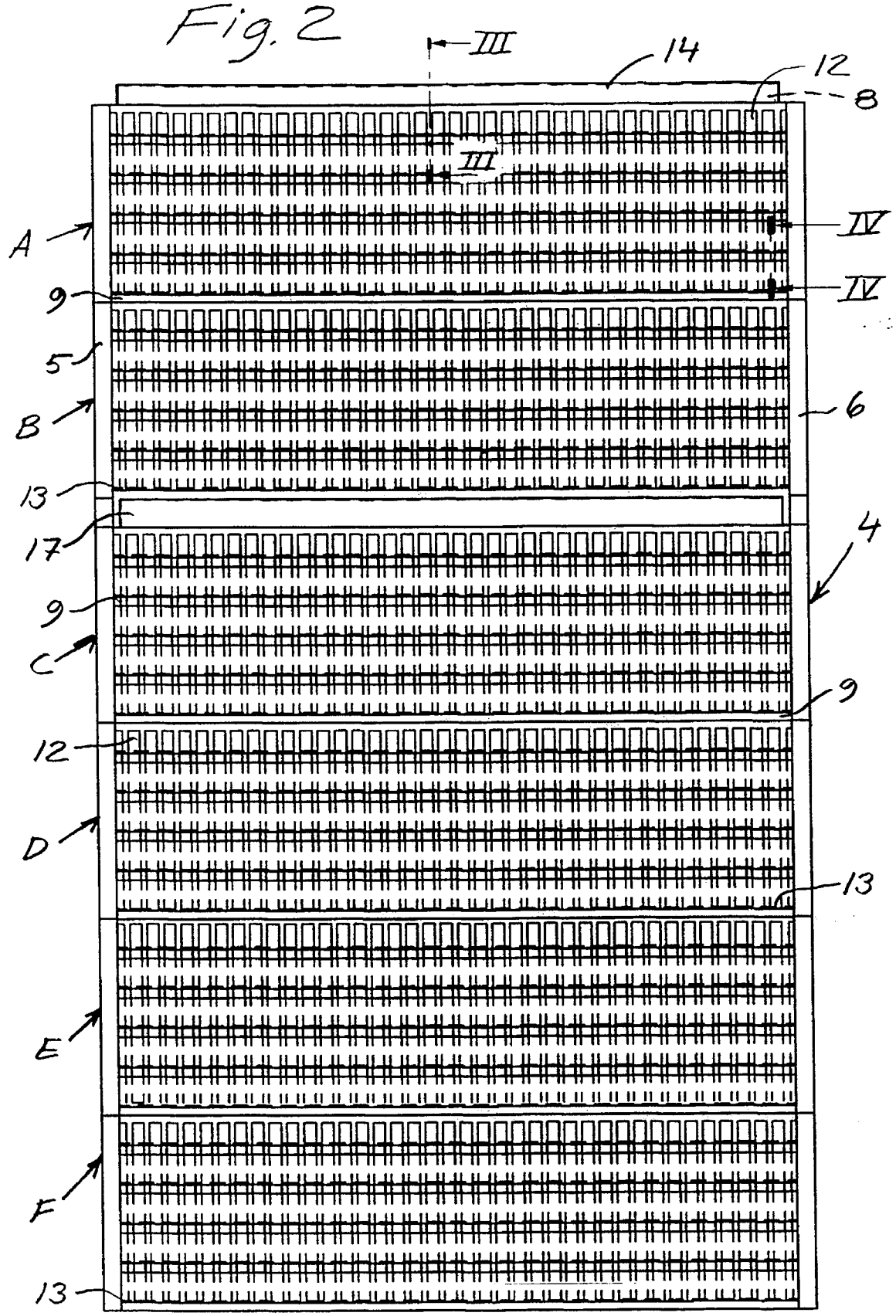
FIG. 2 is a side view of the arrangement taken on the line II—II in FIG. 1.

The pack may include one or more further distribution chambers, so as to increase the capacity of the steam generating arrangement 4. FIGS. 1 and 2 show one such additional chamber 17, which is identical to the chamber 14.

The air delivered by the fan 3 flows over the roof or ceiling 2b of the oven chamber and then down between the wall 2a and the right side wall of the oven. The downwardly moving air meets the gutters 9 and the rods 12 and the thus moistened air then flows into the oven chamber 2, through the openings in the wall 2a. After giving up its heat and moisture content to the bread in the oven chamber 2, the air passes through the perforated wall 2c and is then forced to pass downwards between the perforated wall and the wall 2d. The air then passes through an opening 2e in the wall 2d and then upwards between said wall and the left outer wall of the oven 1 in FIG. 1, where the air is heated by a heating unit 21, prior to the air reaching the fan 3. The described and illustrated steam generating arrangement 4 in the oven 1 and the described and illustrated construction of the arrangement provides effective heating and moistening of the air in the oven chamber 2 in baking the bread, and also provides a construction which is simple and which can be adapted to suit different types of ovens.

The invention is not restricted to the aforedescribed and illustrated embodiment thereof, but solely by the content of the following Claims.

What is claimed is:

1. An arrangement for generating steam in ovens comprising a stand which carried a plurality of superposed and generally horizontally extending gutter means (8, 9), the bottoms of the gutter means including a plurality of through-penetrating holes (11), the holes functioning to allow water to pass to underlying gutter means, and further comprising members (12) mounted adjacent said holes and partially covering said holes, characterized in that at least two of the gutter means are arranged one above the other; in that the members (12) have an elongated form and extend through holes (11) in said at least two gutter means (8, 9) and in that the cross-sectional area of said elongated members (12) adjacent the locations where the elongated members pass through the holes is smaller than the cross-sectional areas of said gutter means.

2. An arrangement according to claim 1, characterized in that the elongated members (12) have a round cross-section.

3. An arrangement according to claim 2, characterized in that the holes (11) are circular and have a larger diameter than the diameter of the elongated members (12).

4. An arrangement according to claim 1, 2 or 3, characterized in that the elongated members (12) are substantially uniform in cross section and made of aluminum.

5. An arrangement according to claim 1, 2 or 3, characterized in that the elongated members (12) rest on the bottoms of selected ones of the gutter means.

6. An arrangement according to claim 1, 2 or 3, characterized by a flow distributor (13) provided with through-penetrating holes, the flow distributor being attached to at least one of the gutter means (9), the lower ends of selected ones of the elongated members (12) resting on the flow distributor.

7. An arrangement according to claim 1, 2 or 3, characterized in that the arrangement is comprised of a plurality of mutually coupled units (A–F), each of which includes parts (5, 6) of said stand and a plurality of gutter means (9).

* * * * *